O. A. PARKER.
VEHICLE WHEEL.
APPLICATION FILED MAY 21, 1915.

1,216,161.

Patented Feb. 13, 1917.
2 SHEETS—SHEET 1.

INVENTOR,
Orel A. Parker.
BY Hull & Smith,
ATT'YS

O. A. PARKER.
VEHICLE WHEEL.
APPLICATION FILED MAY 21, 1915.
1,216,161.
Patented Feb. 13, 1917.
2 SHEETS—SHEET 2.
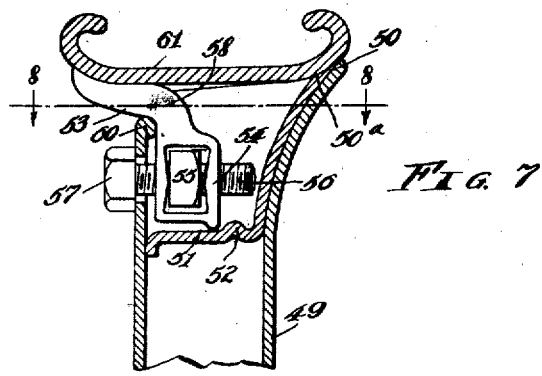
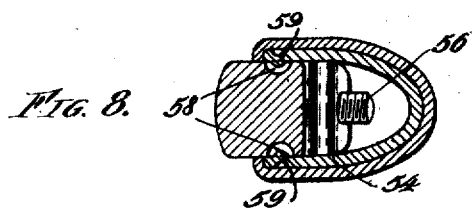
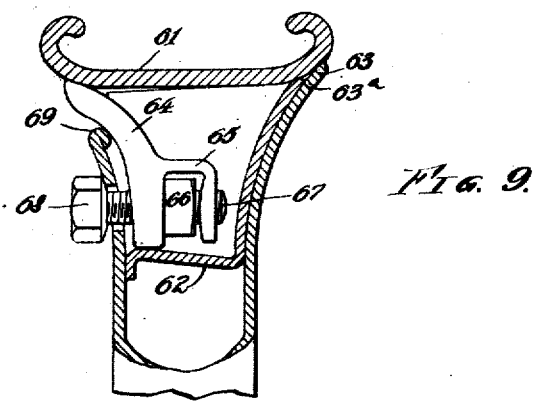
INVENTOR,
Orel A. Parker
BY Hull & Smith
ATTYS.

UNITED STATES PATENT OFFICE.

ORREL A. PARKER, OF CLEVELAND, OHIO.

VEHICLE-WHEEL.

1,216,161.  Specification of Letters Patent.  Patented Feb. 13, 1917.

Application filed May 21, 1915. Serial No. 29,690.

*To all whom it may concern:*

Be it known that I, ORREL A. PARKER, a citizen of the United States, residing at Cleveland, in the county of Cuyahoga and State of Ohio, have invented a certain new and useful Improvement in Vehicle-Wheels, of which the following is a full, clear, and exact description, reference being had to the accompanying drawings.

This invention relates to vehicle wheels and more particularly to constructions whereby demountable rims may be conveniently applied to the ends of the spokes and detached therefrom, the invention herein relating to the type of wheel and demountable rim clamping devices shown, described and claimed in the patent to Gibson No. 986,452.

It is the general object of this invention to provide a construction wherein the clamping members may be contained within the ends of the spokes and whereby said members may be moved into and out of rim-engaging position while retained within such ends. Further and more limited objects of the invention will appear hereinafter in connection with the detailed description and will be set forth in their essential combinations in the claims hereto annexed.

Figure 1:
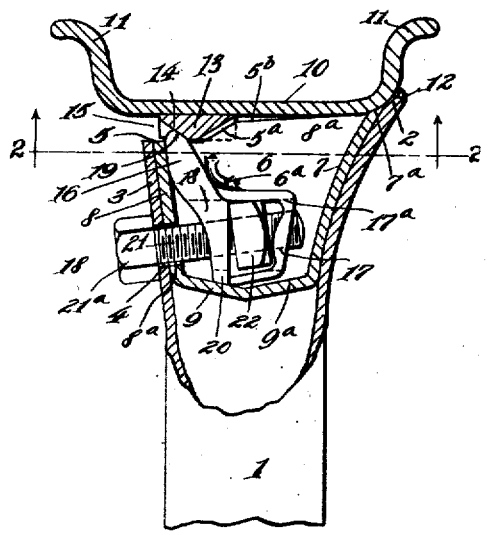
Figure 2:
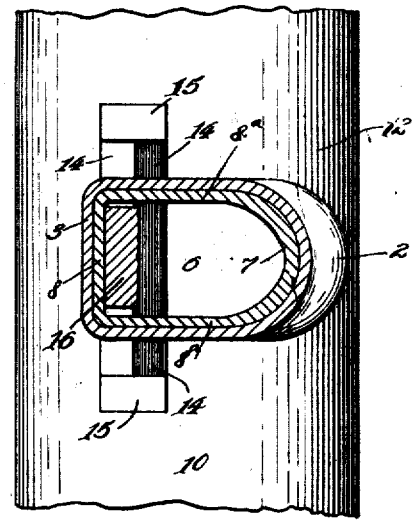
Figure 4:
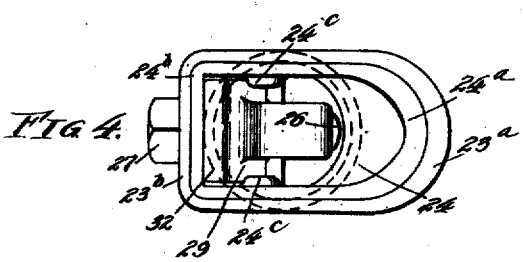
Figure 6:
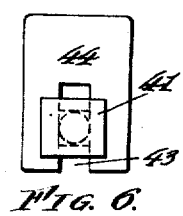
Figure 3:
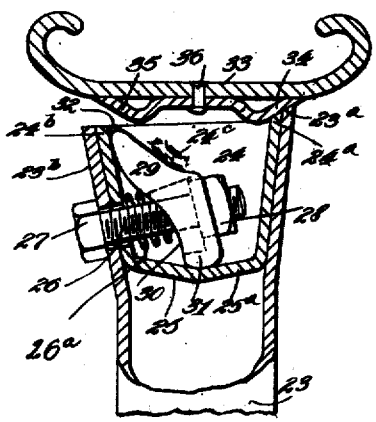
Figure 5:
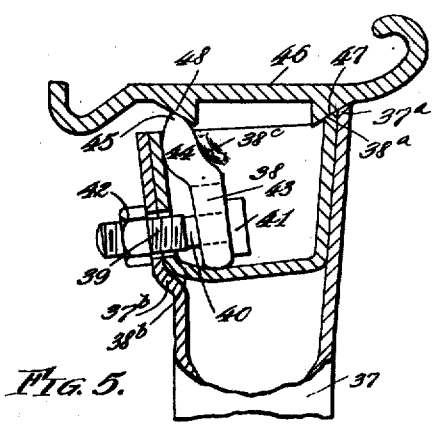

In the drawings forming part hereof, Figure 1 represents a detail, partly in section and partly in elevation, of the outer end of a spoke, showing a rim applied thereto and having my improved construction for locking the rim in place; Fig. 2 is a sectional view corresponding to the line 2—2 of Fig. 1 and looking in the direction of the arrows; Fig. 3 is a view, similar to Fig. 1, of a modified form of my invention; Fig. 4 is a plan view of the spoke-end shown in Fig. 3, the rim being removed; Fig. 5 is a view, similar to Figs. 1 and 3, of a further modification of my invention; Fig. 6 is an elevation of the locking member and the operating means therefor shown in Fig. 5; Fig. 7 is a view, similar to Fig. 1, of a further modification of the invention; Fig. 8 is a sectional detail of such modification taken on the line 8—8 of Fig. 7; and Fig. 9 is a view similar to Fig. 7 of a still further modification of the invention.

Describing by reference characters the various parts illustrated herein, 1 denotes a hollow metal spoke having at the inner side of its outer end an inclined seat which may be formed jointly by the extreme outer end 2 of the spoke and the adjacent inclined end of a cup to be described hereinafter and which is seated within the outer end of the spoke. The outer face of the spoke end 1 is nearly vertical, but is slightly inclined therefrom, as shown at 3, and is provided with an aperture 4 which is adapted to receive a bolt. Because of the fact that this spoke is shown as designed for a rather special type of rim, the outer side thereof is shown as cut off at substantially right angles to the axis of the spoke, as shown at 5.

Within the outer end of the spoke there is mounted the cup, indicated generally at 6, and having an inner wall 7, an outer wall 8, and intermediate side walls 8ª which form a close fit with the corresponding walls of the spoke end. The bottom of this cup is provided with a wall 9 which is inclined outwardly from the central portion thereof to the outer wall 8. Also this bottom wall is preferably inclined from the central portion inwardly, as shown at 9ª. The outer end of the spoke and the cup therewithin constitute a double walled socket, and their extreme outer ends are cut away along the line 5 at substantially right angles to the axis of the spoke, then along the inwardly inclined line 5ª and then along the inwardly inclined line 5ᵇ, the purpose of this construction being to provide for conveniently seating the particular type of demountable rim shown in Fig. 1 upon the spoke ends. 10 indicates the rim referred to, said rim having the side flanges 11 each of which is joined with the body of the rim by a rounded lateral surface 12. One of these surfaces is adapted to engage the seat formed by the surfaces 2 and 7ª at the inner side of the spoke end and at the inner side of the coöperating cup therewithin. The surface 5ᵇ is of sufficient inclination to permit the rim to be applied to this seat without hindrance. I have shown the rim 10 as provided with a series of metal blocks 13 each having an inclined lateral seating surface 14, each block being provided with a square shoulder 15 at opposite ends thereof, said shoulders being preferably the full depth of the block. These shoulders afford a convenient means for securing the blocks to the rim, as by spot-welding. It will be seen that the surfaces 5 and 5ª permit the rim to be moved inwardly so that its seating surface 12 may engage the seat 2, 7ª, without any obstruction due to the presence of the blocks 13.

Within the cup 6 there is located the locking member. This member, as shown in Figs. 1 and 2, comprises an arm 16 having a cage 17 at the bottom or inner end thereof which cage is adapted to retain against rotation a nut 22 mounted on a bolt 21 which extends through the aperture 4 in the wall 3, through the aperture 8ª in the wall of the cup 8, and through an elongated slot 18 in said arm, the rear or inner end of the bolt being adapted to project through a similar elongated slot 17ª in the inner wall of the cage 17. The upper end of the member 16 is provided with a rounded or inclined surface 19 which is adapted to engage the inclined surface 14 of the block 13 while the bottom 20 of the lever arm is adapted to rest upon the bottom of the cup 6. In order to assist in the operation of the lever arm 16 as well as to retain it in readiness for the rim locking operation, laterally retaining studs are provided on the side walls of the cup 6. One of these studs is indicated at 6ª, and the studs may be formed conveniently by pressing opposed parts of the cup sides toward each other.

With the construction illustrated and described, it is believed that the operation will be clear. By turning the bolt 21 in a suitable direction as by means of a wrench applied to the head 21ª, the bottom of the member 16 will be moved toward the inner face of the cup. The member 16 being larger than the wall 8, its outer end will be projected beyond said wall and the outer end of the spoke as its inner end is moved along the inclined wall 9. The studs or projections 6ª insures at all times a proper relation between the member 16 and the walls 8ª and 9 and retain the member in place even should the bolt be disconnected therefrom.

The members 16 being retracted, the rim may be applied to the seats 2, 7ª, the bolts 21 being rotated in a direction to move the bottoms of the members outwardly, with the result that the lower ends of the members will slide along the inclined surfaces 9 and the upper ends will slide along the walls 8, (being sufficiently confined by the studs 6ª) with the result that the extreme outer ends of the members will be thrust into engagement with the inclined surfaces 14 of the blocks 13.

Reference has been made to the shoulders 15 of said blocks. These shoulders not only afford a convenient means for securing the blocks to the rim, but limit the creeping that the rim may have on the spoke ends through the careless application of the same to the spoke ends or because of possible slacking of the bolts after such application. It will be evident that one of the shoulders 15 on one of the blocks will engage a projecting lever arm and thus limit the creeping of the rim so as to prevent any possibility of cutting off the outer valve connection.

In Figs. 3 and 4 there is shown a modification of my invention wherein the end of the spoke 23 is similar to the end of the spoke 1 and has a cup 24 in the outer end thereof which is similar to the cup 6, the inner sides of the ends of the spoke and cup forming an inclined seat (indicated at 23ª and 24ª) for a corresponding lateral seating surface on the rim. The cup is provided with a bottom which is inclined from the central portion toward the inner and outer faces of the spoke, as indicated at 25 and 25ª; also the outer face 23ᵇ of the spoke and the corresponding face 24ᵇ of the cup are provided with alined apertures for the reception of a bolt 26 having a head 27 at the outer end thereof and provided with a nut 28 at the inner end. This nut may fit within the outer face of a movable member 29 which is generally similar to the member 16, the member 29 having an elongated slot 30 for the bolt 26 and a squared recess for the nut 28. One end 31 of this member bears against the bottom of the cup 24 and its other end 32 is adapted to be projected beyond the cup by adjusting the bolt 26 in the appropriate direction to move the inner end 31 along the inclined wall 25. The sides of the cup 24 are provided with inwardly pressed portions 24ᶜ which are adapted to guide the member 29 in its movements and prevent the same from accidentally falling out of the cup should the bolt become disconnected from its nut. A spring 26ª surrounds the bolt 26 and bears at one end against the movable member 29 and at its other end against the adjacent wall of the cup 24. This spring tends to retract the member 29 when the bolt is slacked off.

33 denotes the demountable rim, which, in this case, may be provided with a pair of oppositely inclined lateral seats one of which (34) is adapted to engage the seat 23ª, 24ª, while the other (35) is adapted to be engaged by the outer end 32 of the member 29. These seats 34 and 35 may conveniently be provided on a band of pressed metal which may be conveniently secured to the rim proper, as by means of rivets 36.

In Figs. 5 and 6 there is shown a further modification of my invention. In these views, 37 denotes the spoke end, which in this case is substantially identical with that shown in Figs. 3 and 4. The spoke end 37 is provided with an inclined surface 37ª corresponding to the surfaces 2 and 23ª, and within the outer end of this spoke end there is mounted a cup 38 which is similar to the cup 34 and having a seating surface 38ª similar to the seating surface 24ª. The outer face of the spoke 37 is offset or pressed outwardly, as shown at 37ᵇ, to form a seat for the inner end of the cup, while the outer faces of the cup and spoke end are provided with alined apertures for a bolt 39 having a reduced squared inner portion 40, a head 41 at the end of such reduced portion, and an operating nut 42 on the outer end thereof. This reduced portion of the bolt is insertible into a slot 43 at the inner end of a lever arm or member 44, the outer end whereof is adapted to be projected against a suitable lateral seat or surface on the rim. The slotted end of the member is adapted to ride along the inclined portion 38ᵇ of the cup 38 whereby the opposite or outer end 45 of said member may be projected outwardly when the nut 42 is tightened. The intermediate walls of the cup 38 will be provided with inwardly projecting studs 38ᶜ corresponding to the studs 6ᵃ and 24ᶜ.

With the spoke end construction shown in Fig. 5, I have shown another form of rim 46 having a pair of ribs 47, 48, said ribs having oppositely inclined surfaces, the rib 47 being adapted to engage the seat 37ᵃ, 38ᵃ, and the inclined surface 48 being adapted to be engaged by the outer ends 45 of the levers or members 44.

In Figs. 7 and 8 there is shown a still further modification wherein the rim-engaging or clamping member is supported and pivoted in a somewhat different manner from that shown in the preceding views. In these views, 49 denotes the cupped upper end of the spoke having the lateral seat 50, 50ᵃ, and the bottom wall 51 having a shoulder 52. The locking member is similar to that shown in Fig. 1 and comprises a body 53 with a cage 54 at its lower end for the nut 55 on the bolt 56 the head 57 whereof is located outside of the upper end of the spoke. The locking member is provided at its upper portion with a pair of opposed recesses 58 into which the sides of the spoke are pressed thereby to retain the members in place, as indicated at 59, the projections being considerably smaller than the recesses, whereby the member may rock upon the edge of the spoke, while the upper end of the outer side of the spoke is slotted, thus coöperating with the pivots 59 to rock the outer end of the lever radially and laterally as the inner end is moved along the bottom of the cup. The ledge or shoulder 52 limits the movement of the inner end of the lever. The outer wall of the spoke is thickened, as indicated at 60, the better to support the clamping member, the rim shown at 61 being of the ordinary demountable type.

In Fig. 9 there is shown a still further modification wherein the upper end of the spoke is provided with an inclined bottom wall 62 and a fixed seat or arm 63, 63ᵃ. The clamping lever in this case consists of a body 64 having a cage 65 for the nut 66 on the bolt 67, the outer end of the bolt being provided with a head 68. The upper outer wall of the spoke is slotted to permit the locking lever arm to extend therethrough and the metal at the bottom of the slot is bent upon itself, as shown at 69, to provide a reinforcement at the line of contact between the clamping lever and the spoke end. The operation of the device shown in Fig. 9 is substantially the same as that of the devices shown in Figs. 1 to 5 inclusive. By adjusting the bolt head 68, the bottom of the clamping lever is moved along the inclined wall 62, thereby to thrust the outer end of the lever either outwardly and toward the arm 63, 63ᵃ or inwardly and away from such arm. The demountable rim in Fig. 9 is shown as the same type as that shown in Fig. 7.

The constructions disclosed herein provide a particularly neat appearance for the ends of the spokes, the locking members being located within such ends and the sockets provided thereby, leaving only the ends of the bolts to project through the outer surfaces of the spokes. Placing the nut within the cage, as shown in Figs. 1, 7 and 9, not only prevents the nut from turning with the bolt, but serves to retain the nut against loss, should the bolt happen to become disconnected therefrom.

Having thus described my invention, what I claim is:

1. In a vehicle wheel, the combination of a plurality of spokes each having a hollow outer end and a support within such end, each spoke having at one side of such outer end an arm or seat coöperating with a corresponding seating portion of a rim, a movable member one portion whereof is adapted to move along the support thereby to project another portion thereof into engagement with the oppositely located seating portion of such rim, and means for so adjusting said member.

2. In a vehicle wheel, the combination of a plurality of spokes each having a hollow outer end and an inclined support within such end, each spoke having at one side of such outer end an arm or seat coöperating with a corresponding seating portion of a rim, a movable member one portion whereof is adapted to move along the support thereby to project another portion thereof into engagement with the oppositely located seating portion of such rim, and adjusting means for said member extending into said spoke end and operatively connected with said member.

3. In a vehicle wheel the combination of a plurality of spokes each having a hollow metallic outer end and an inclined support therewithin, one side of the spoke-end being provided with an arm or seat adapted to cooperate with one of the lateral seating portions of a demountable rim, a movable member within each spoke-end, one end of said member being adapted to move along the inclined support and the opposite end being adapted by such movement to be projected into operative relation to the opposite lateral seating portion of such rim, confining means within such spoke end adapted to engage an intermediate portion of such member, and adjusting means operatively connected with said member and extending through such spoke end.

4. In a vehicle wheel the combination of a plurality of spokes each having a hollow metallic outer end and a support therewithin, one side of the spoke end being provided with an arm or seat adapted to coöperate with one of the lateral seating portions of a demountable rim, a movable member within each spoke end, one end of said member being adapted to move along the inclined support and the opposite end being adapted by such movement to be projected into operative relation to the opposite lateral seating portion of such rim, means loosely confining said member within such spoke end, and adjusting means operatively connected with said member.

5. A clamping device for one side of a demountable rim comprising a hollow spoke end having a lateral wall and a support within such spoke end, a clamping member loosely mounted in such spoke end and adapted to bear with one portion against the support and with another portion against such lateral wall and, by its movement along the support, to have another portion thrust beyond the spoke end, and means for so moving said member.

6. A clamping device for one side of a demountable rim comprising a hollow spoke end having a lateral wall and an inclined support within such spoke end, a clamping member loosely mounted in such spoke end and adapted to bear with one portion against the inclined support and with another portion against such lateral wall and, by its movement along the inclined support, to have another portion thrust beyond the spoke end, means for so moving said member, and means for retaining said member in operative relation to the inclined support and the lateral wall.

7. A clamping device for one side of a demountable rim comprising a hollow spoke end having a lateral wall and a wall within the spoke end adjacent to the first wall, a member which is longer than said lateral wall and having its inner end supported by the second wall and a portion adapted to engage the first wall whereby, as its inner end is moved toward the lateral wall, its outer end will be projected outwardly beyond the spoke end, means connected with said member for so moving the inner end thereof along its supporting wall, and means for retaining said member in operative relation to both of said walls.

8. A clamping device for one side of a demountable rim comprising a hollow spoke end having a lateral wall and a wall within the spoke end adjacent to the first wall, a member which is longer than said lateral wall and having a portion supported by the second wall and another portion adapted to engage the lateral wall whereby, as the first mentioned portion is moved toward the lateral wall its outer end will be projected outwardly beyond the spoke end, and means connected with said member for so moving the first mentioned portion thereof along the second wall.

9. A clamping device for one side of a demountable rim comprising a hollow spoke end having a lateral wall and an inclined wall within the spoke end adjacent to the lateral wall, a member which is of greater length than the lateral wall, and which is adapted to be supported at one end by such inclined wall with its outer end portion in engagement with the lateral wall, and means for adjusting the inner end of said member along such inclined wall.

10. A clamping device for one side of a demountable rim comprising a hollow spoke end having a lateral wall and a wall within the spoke end adjacent to the lateral wall, a member which is of greater length than the lateral wall and which is adapted to be supported at one end by such inner wall with its outer end portion in engagement with the lateral wall, and means for adjusting the inner end of said member along such inner wall, said means comprising a bolt extending through the spoke end and having a head outside such end, a nut on the inner end of said bolt, and means associated with the movable member for preventing the rotation of the nut.

11. In a vehicle wheel, the combination of a plurality of spokes each having a hollow metallic end, a clamping device for one side of a demountable rim within said spoke end and comprising a lateral wall and a wall within the spoke end adjacent to the lateral wall, a member which is of greater length than the lateral wall and which is adapted to be supported at one end by such inner wall with its outer end portion in engagement with the lateral wall, and means for adjusting the inner end of said member along such inner wall, said means comprising a bolt extending through the spoke end and having a head outside such end, a nut on the inner end of said bolt, and a cage carried by said movable member for the nut whereby the bolt may be rotated without corresponding rotation of the nut.

12. In a vehicle wheel, the combination of a plurality of spokes each having a hollow metallic end, a clamping device for one side of a demountable rim within said spoke end and comprising a movable member within such spoke end, means for adjusting said member, said means comprising a bolt extending through the spoke end and having a head outside such end, a nut on the inner end of said bolt, and a cage carried by said movable member for the nut, whereby the bolt may be rotated without corresponding rotation of the nut.

13. In a vehicle wheel, the combination of a plurality of spokes each having a hollow metallic end, a clamping device for one side of a demountable rim within said spoke end and comprising a lateral wall and a wall within the spoke end adjacent to the lateral wall, a member which is of greater length than the lateral wall and which is adapted to be supported at one end by such inner wall with its outer end portion in engagement with the lateral wall, means for adjusting the inner end of said member along such inner wall, said means comprising a bolt extending through the lateral wall of the spoke end and having a nut at one end and a head at the other, and means associated with said member for preventing the nut and bolt from rotating together.

14. In a vehicle wheel, the combination of a plurality of spokes each having a hollow metallic end, a clamping member for one side of a demountable rim within said spoke end, means for adjusting said member thereby to project its outer end beyond the spoke end, said means comprising a bolt extending through the lateral wall of the spoke end and having a nut at one end and a head at the other, and means associated with said member for preventing the nut and bolt from rotating together.

15. In a vehicle wheel, the combination of a plurality of spokes each having a hollow metallic outer end, a cup within such end and having an inclined bottom, each of said spokes having at one side thereof a seat or arm for one of the lateral seating portions of a demountable rim, a movable member within said cup and having one end thereof adapted to bear against the inclined bottom of the cup and arranged so that, by the movement of such end along the inclined bottom, the opposite end will be projected outwardly thereby to engage the opposite lateral seating portion of such rim, confining means between the top and bottom of the cup arranged to guide the movement of said member, and adjusting means for said member extending through the spoke and into the cup.

16. In a vehicle wheel, the combination of a plurality of spokes each having a hollow metallic outer end, a cup within such end, each of said spokes having at one side thereof a seat or arm for one of the lateral seating portions of a demountable rim, a movable member within said cup, a support for said member within said cup along which the member is adapted to be moved thereby to project its outer end into engagement with the opposite lateral seating portion of such rim, and adjusting means for said member.

17. In a vehicle wheel, the combination of a plurality of spokes each having a hollow metallic outer end and a cup within such end having its bottom inclined toward one of the side walls of the cup, the side wall of the outer end of the spoke which is opposite the side wall of the cup forming an outwardly projecting arm or seat for one of the lateral seating portions of a rim, a movable member within said cup and adapted to bear with one end against the inclined bottom thereof and by its adjustment along such bottom to have its other end projected into and out of operative relation to the opposite lateral seating portion of said rim, said cup being provided with means for retaining said member in position whereby its outer end will be in engagement with the aforesaid lateral wall of the cup, and operating means for said member extending through the cup and to the exterior of the spoke end.

18. In a vehicle wheel, the combination of a plurality of spokes each having a metallic outer end provided at one side thereof with a lateral arm or seat for the corresponding lateral seating portion of a desponding demountable rim, a cup within the outer end of each spoke, said cup having a lateral wall opposite said seat and a wall extending at an angle to such lateral wall, a member within said cup and of greater length than the lateral wall thereof and having one end portion supported by the second wall and its opposite end portion adapted to engage the lateral wall whereby, as its inner end is moved toward the lateral wall its outer end will be projected outwardly beyond the spoke end, means connected with said member for so moving the inner end thereof along its supporting wall and means for retaining said member in operative relation about both of said walls.

19. In a vehicle wheel, the combination of a plurality of spokes each having a metallic outer end provided at one side thereof with a lateral arm or seat for the corresponding lateral seating portion of a demountable rim, a cup within the outer end of each spoke, said cup having a lateral wall opposite said seat and a wall extending at an angle to such lateral wall, a member within said cup and of greater length than the lateral wall thereof and having one end portion supported by the second wall and its opposite end portion adapted to engage the lateral wall whereby, as its inner end is moved toward the lateral wall its outer end will be projected outwardly beyond the spoke end, and means connected with said member for so moving the inner end thereof along its supporting wall.

20. In a vehicle wheel, the combination of a plurality of spokes each having a hollow metallic outer end, a cup within such end and substantially conforming thereto, each spoke having a lateral seat or arm adapted to engage the corresponding lateral seating portion of a demountable rim, the bottom of the cup being inclined toward the wall thereof which is opposite said seat or arm and having adjacent to but spaced from such lateral wall a pair of projections, a clamping member for the opposite lateral seating portion of such arm loosely mounted in said cup between such projections and such lateral wall, said member being of greater length than the lateral wall and having its inner end arranged to be supported by the inclined cup bottom and to be moved therealong with its outer end portion sliding along the said lateral wall whereby the extreme outer end of said member may be projected beyond the cup and into engagement with the second lateral seating portion of the rim, said member having a cage, and a bolt extending through the spoke end, the lateral wall of the cup and said member, a head on the outer end of said bolt, and a nut on the inner end of said bolt within said cage.

21. In a vehicle wheel, the combination of a plurality of spokes each having a hollow metallic outer end, a cup within such end and substantially conforming thereto, each spoke having a lateral seat or arm adapted to engage the corresponding lateral seating portion of a demountable rim, a support within the cup, a clamping member for the opposite lateral seating portion of such rim mounted on said support and movable therealong whereby its outer end may be projected beyond the cup and into engagement with the second lateral seating portion of the rim, and means extending within the cup for so moving said member.

22. The combination, with a tire carrying member and spokes each having a hollow outer end and a seat at one side of such end, of a device within each spoke end adapted to effect lateral pressure against said member to force the same toward said seat, and means for operating each of said devices.

23. The combination, with a tire carrying member having laterally spaced seating surfaces and spokes each having a hollow outer end and a seat adapted to engage one of said surfaces, of a device within each spoke end adapted to be brought into engagement with the other surface of said member, and means for operating each of said devices.

24. The combination, with a tire carrying member and spokes each having a hollow outer end with a seat at one side of such end adapted to engage a coöperating portion of the said member, of a device within each spoke end for engaging another portion of the tire carrying member which is laterally spaced from the first mentioned portion, and means for operating each of said devices.

25. The combination, with a tire carrying member and spokes each having a hollow outer end with a seat at one side of such end adapted to engage a coöperating portion of the said member, of a device within each spoke end for engaging another portion of the tire carrying member which is laterally spaced from the first mentioned portion, and means whereby said device may be operated thereby to project a portion thereof outwardly into engagement with the coöperating surface of the wheel carrying member and to exert a lateral pressure against such portion.

In testimony whereof, I hereunto affix my signature in the presence of two witnesses.

ORREL A. PARKER.

Witnesses:
O. P. STEHN,
H. O. DAVIDSON.